(12) United States Patent
Nakada et al.

(10) Patent No.: US 10,341,153 B2
(45) Date of Patent: Jul. 2, 2019

(54) PEAK POWER REDUCTION DEVICE IN COMMUNICATION SYSTEM

(71) Applicant: HITACHI KOKUSAI ELECTRIC INC., Tokyo (JP)

(72) Inventors: Tatsuhiro Nakada, Tokyo (JP); Hiroki Kato, Tokyo (JP); Kei Ito, Tokyo (JP); Satoru Ejima, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 30 days.

(21) Appl. No.: 15/742,955

(22) PCT Filed: Jun. 7, 2016

(86) PCT No.: PCT/JP2016/066914
§ 371 (c)(1),
(2) Date: Jan. 9, 2018

(87) PCT Pub. No.: WO2017/010196
PCT Pub. Date: Jan. 19, 2017

(65) Prior Publication Data
US 2019/0089565 A1 Mar. 21, 2019

(30) Foreign Application Priority Data
Jul. 14, 2015 (JP) .................................. 2015-140473

(51) Int. Cl.
*H04L 27/26* (2006.01)
*H04B 7/0456* (2017.01)
(Continued)

(52) U.S. Cl.
CPC ....... *H04L 27/2615* (2013.01); *H04B 7/0434* (2013.01); *H04B 7/0465* (2013.01); *H04J 11/0023* (2013.01); *H04L 27/2618* (2013.01)

(58) Field of Classification Search
CPC .............. H04L 27/2615; H04L 27/2618; H04J 11/0023; H04B 7/0434; H04B 7/0465
See application file for complete search history.

(56) References Cited

U.S. PATENT DOCUMENTS 8,755,457 B2 * 6/2014 Higuchi ................. H04J 11/003
375/299
2011/0096658 A1 * 4/2011 Yang ..................... H04L 5/0023
370/210

FOREIGN PATENT DOCUMENTS

JP 2011-166725 A 8/2011
JP 2014-241510 A 12/2014

OTHER PUBLICATIONS

Wakeel et al., Least-Squares Iterative Peak-to-Average Ratio Reduction for MIMO-OFDM Systems (Year: 2014).*

(Continued)

*Primary Examiner* — Ian N Moore
*Assistant Examiner* — Justin T Van Roie
(74) *Attorney, Agent, or Firm* — Bacon & Thomas, PLLC

(57) ABSTRACT

A peak power reduction device includes a unit for dividing digital information to be transmitted into a plurality of streams; a unit for selecting the modulation level of the streams and distribution of transmission power according to a transmission state; a unit for performing singular-value decomposition on the transmission path characteristic of a streams and precoding the resultant data by a right singular value matrix; a unit for performing complex mapping on the subcarrier of a stream according to the modulation level; a unit for converting a complex mapping signal into a time domain signal; a first unit for storing a conversion result as a time domain signal; a second unit for calculating a peak time signal exceeding a predetermined threshold value from (Continued)

a peak value, if any exists, that exceeds a prescribed threshold value for the amplitude of the time domain signal.

3 Claims, 5 Drawing Sheets

(51) Int. Cl.
*H04B 7/0426* (2017.01)
*H04J 11/00* (2006.01)

(56) References Cited

OTHER PUBLICATIONS

Written Opinion of the International Searching Authority in corresponding International Application No. PCT/JP2016/066914, dated Aug. 16, 2016.
International Preliminary Report of Patentability in corresponding International Application No. PCT/JP2016/066914, dated Jan. 16, 2018.
Shoki Inoue et al., "Throughput Performance of CF-Based Adaptive PAPR Reduction Method for Eigenmode MIMO-OFDM Signals Using AMC with QAM Modulation and Turbo Coding", IEICE Technical Report, Jun. 16, 2011, vol. 111, No. 94, pp. 197-202.
Yohei Onuki et al., "Effect of PAPR reduction method with peak canceling signal allocation for Eigenmode MIMO-OFDM systems", IEICE Technical Report, Sep. 26, 2014, vol. 114, No. 235, pp. 1-5.

\* cited by examiner

FIG.8

$\varepsilon = 0.1\text{dB}$

| MODULATION SCHEME | $10\log(\Gamma_0)$ [dB] | $\Gamma_0$ | $8192/(\Gamma_0)(10^{2/10}-1)$ | ALLOWABLE EVM DETERIORATION $10\log\{\Gamma_0(10^{2/10}-1)\}$ [dB] |
|---|---|---|---|---|
| 1024QAM | 21 | 125.9 | 2 | 37.3 |
| 256QAM | 17 | 50.1 | 4 | 33.3 |
| 64QAM | 13 | 20.0 | 10 | 29.3 |
| 16QAM | 9 | 7.9 | 24 | 25.3 |
| QAM | 3 | 2.0 | 96 | 19.2 |

$\varepsilon = 0.2\text{dB}$

| MODULATION SCHEME | $10\log(\Gamma_0)$ [dB] | $\Gamma_0$ | $8192/(\Gamma_0)(10^{2/10}-1)$ | ALLOWABLE EVM DETERIORATION $10\log\{\Gamma_0(10^{2/10}-1)\}$ [dB] |
|---|---|---|---|---|
| 1024QAM | 21 | 125.9 | 3 | 34.3 |
| 256QAM | 17 | 50.1 | 8 | 30.3 |
| 64QAM | 13 | 20.0 | 19 | 26.3 |
| 16QAM | 9 | 7.9 | 49 | 22.3 |
| QAM | 3 | 2.0 | 193 | 16.3 |

$\varepsilon = 0.5\text{dB}$

| MODULATION SCHEME | $10\log(\Gamma_0)$ [dB] | $\Gamma_0$ | $8192/(\Gamma_0)(10^{2/10}-1)$ | ALLOWABLE EVM DETERIORATION $10\log\{\Gamma_0(10^{2/10}-1)\}$ [dB] |
|---|---|---|---|---|
| 1024QAM | 21 | 125.9 | 8 | 30.1 |
| 256QAM | 17 | 50.1 | 20 | 26.1 |
| 64QAM | 13 | 20.0 | 50 | 22.1 |
| 16QAM | 9 | 7.9 | 126 | 18.1 |
| QAM | 3 | 2.0 | 501 | 12.1 |

$\varepsilon = 1.0\text{dB}$

| MODULATION SCHEME | $10\log(\Gamma_0)$ [dB] | $\Gamma_0$ | $8192/(\Gamma_0)(10^{2/10}-1)$ | ALLOWABLE EVM DETERIORATION $10\log\{\Gamma_0(10^{2/10}-1)\}$ [dB] |
|---|---|---|---|---|
| 1024QAM | 21 | 125.9 | 17 | 26.9 |
| 256QAM | 17 | 50.1 | 42 | 22.9 |
| 64QAM | 13 | 20.0 | 106 | 18.9 |
| 16QAM | 9 | 7.9 | 267 | 14.9 |
| QAM | 3 | 2.0 | 1063 | 8.9 |

PEAK POWER REDUCTION DEVICE IN COMMUNICATION SYSTEM

FIELD OF THE INVENTION

The present invention relates to a method of reducing peak power versus average power in eigenmode MIMO transmission for transmitting a plurality of streams of a communication system and, more particularly, to a device for peak power reduction in multicarrier transmission such as an OFDM scheme or the like.

BACKGROUND OF THE INVENTION

A MIMO (Multiple Input Multiple Output) technique that spatially multiplexes and transmits a plurality of streams using a plurality of transmitting/receiving antennas has been put to practical use. Transmission capacity can be increased by this MIMO transmission. As one of MIMO transmission schemes, there is available an eigenmode MIMO transmission scheme that can use, to the utmost, the potential transmission capacity of a transmission path when the state of a transmission path can be grasped on the transmission side.

In the eigenmode MIMO transmission scheme, assuming the transmission path characteristic as H as shown in Expression 1, the transmission path characteristic is singular-value-decomposed as preprocessing of eigenmode transmission.

$$H = U\Sigma V^H \quad \text{(Expression 1)}$$

(H on the upper right side of V indicates complex conjugate transpose)

In Expression 1, U denotes a left singular value matrix, V denotes a right singular value matrix, and $\Sigma$ is a matrix indicating an eigenvalue ($\sqrt{\lambda_k}$) whose diagonal component is H as shown in Expression 2. In addition, the elements of each matrix are complex numbers. In the following description, the elements of a matrix and a vector are assumed to be complex numbers unless otherwise stated.

$$\Sigma = \text{diag}\{\sqrt{\lambda_1}\sqrt{\lambda_2} \ldots \sqrt{\lambda_L}\} \quad \text{(Expression 2)}$$

where $\lambda_1 > \lambda_2 > \ldots > \lambda_L$.

In eigenmode MIMO transmission, L stream vectors $S = [S1\ S2\ \ldots\ SL]^T$ are used as streams for performing information transmission. Information is transmitted by placing the information on the amplitude and phase of the stream vectors S. After multiplying the stream vectors S by the right singular value matrix V, a transmission signal vector X is generated. Furthermore, the transmission power of each stream is appropriately distributed by using the principle called a water injection theorem, where by the increase in the transmission capacity can be expected.

Assuming that the power distribution matrix is $P = \text{diag}\{\sqrt{p_1}\ \sqrt{p_2}\ \ldots\ \sqrt{p_{n-1}}\}$, the transmission signal vector X is represented by Expression 3.

$$X = VPS \quad \text{(Expression 3)}$$

The processing shown in Expression 3 is referred to as precoding processing on the stream vectors S. The transmission signal vector X after precoding is transmitted from each transmission antenna.

The reception signal vector Y is a signal obtained by adding a thermal noise vector N (where a variance is $\sigma^2$) after the transmission signal vector X passes through the transmission path matrix H.

$$Y = HX + N \quad \text{(Expression 4)}$$

Expression 1 and Expression 3 are substituted into Expression 4 to obtain Expression 5.

$$Y = (U\Sigma V^H)(VPS) + N$$

$$Y = U\Sigma PS + N \quad \text{(Expression 5)}$$

The transmission stream vector S indicated in Expression 6 is estimated by subjecting the reception signal vector Y represented by Expression 5 to spatial filter processing for decomposing the reception signal vector Y for each stream. The spatial filter processing can be realized by multiplying the reception signal vector Y by a complex conjugate transpose matrix UH of the left singular value matrix.

$$\hat{S} = U^H Y$$

$$\hat{S} = U^H(U\Sigma PS + N)$$

$$\hat{S} = \Sigma PS + U^H N \quad \text{(Expression 6)}$$

In Expression 6, the first term $\Sigma PS$ on the right side denotes a signal component, and the second term $U^H N$ denotes a noise component. The details of the signal component of the first term are shown in Expression 7.

$$\Sigma PS = \begin{bmatrix} \sqrt{\lambda_1} & 0 & 0 & 0 \\ 0 & \sqrt{\lambda_2} & 0 & 0 \\ \vdots & \vdots & \vdots & \vdots \\ \vdots & \vdots & \vdots & \vdots \\ 0 & 0 & 0 & \sqrt{\lambda_L} \end{bmatrix} \quad \text{(Expression 7)}$$

$$\begin{bmatrix} \sqrt{P_1} & 0 & 0 & 0 \\ 0 & \sqrt{P_2} & 0 & 0 \\ \vdots & \vdots & \vdots & \vdots \\ \vdots & \vdots & \vdots & \vdots \\ 0 & 0 & 0 & \sqrt{P_L} \end{bmatrix} \begin{bmatrix} s_1 \\ s_2 \\ \vdots \\ s_L \end{bmatrix}$$

$$\Sigma PS = \begin{bmatrix} \sqrt{\lambda_1 P_1}\ s_1 \\ \sqrt{\lambda_2 P_2}\ s_2 \\ \vdots \\ \sqrt{\lambda_{n-1} P_{n-1}}\ s_{n-1} \end{bmatrix}$$

Similarly, the details of the noise component of the second term are shown in Expression 8.

$$U^H N = U^H \begin{bmatrix} n_1 \\ n_2 \\ \vdots \\ n_{n-1} \end{bmatrix} \quad \text{(Expression 8)}$$

In Expression 8, $[n1\ n2\ \ldots\ nn-]^T$ is a thermal noise exhibiting a Gaussian distribution, the average value of each element is 0, and the variance is $\sigma^2$. Since UH is a unitary matrix, there is no such thing as emphasizing this noise level.

The SN ratio of each stream is calculated using Expression 7 and Expression 8. Assuming that the SN ratio of the $k^{th}$ stream is SNRk, Expression 9 is obtained.

$$SNR_k = \frac{\lambda_k P_k E[|s_k|^2]}{\sigma^2}$$ (Expression 9)

$$SNR_k = \lambda_k P_k \frac{P_s}{\sigma^2}$$

where $P_s = E[|s_k|^2]$.

As shown in Expression 9, if appropriate precoding processing is performed, the SN ratio of each stream becomes a value corresponding to the eigenvalue of the transmission path and the power distribution matrix. Although not described in detail, according to the theory of the water injection theorem of the eigenmode MIMO transmission scheme, it is possible to transmit a large amount of information by performing large power distribution $\sqrt{P_k}$ for a stream having a large eigenvalue $\sqrt{\lambda_k}$.

Therefore, by allocating a modulation scheme with a large multi-value number (for example, 256 QAM (Quadrature Amplitude Modulation), etc.), it is possible to make maximum use of the potential transmission capacity of the transmission path. Conversely, since it is impossible to transmit a lot of information with a stream having a small eigenvalue, a modulation scheme with a small multi-value number (for example, QPSK (Quadrature Phase Shift Keying), etc.) is allocated.

By the eigenmode transmission MIMO scheme described above, it is possible to perform transmission with the maximum transmission capacity for the transmission path.

In addition, when the eigenmode MIMO transmission is applied to a wide frequency bandwidth, the characteristics of the transmission path often become different for each frequency $\omega$ due to the influence of multipath or the like. Therefore, the transmission path characteristic matrix $H(\omega)$ is represented by a function of the frequency $\omega$. In an environment having such frequency characteristics, it is possible to optimize the transmission capacity by appropriately performing the above-described stream distribution for each frequency ($\omega$). In order to perform optimization on a frequency-by-frequency basis, an OFDM (Orthogonal Frequency Division Multiplexing) modulation scheme that performs transmission while making narrowband multiple subcarriers orthogonal to each other is used, whereby stream distribution suitable for the transmission path H ($\omega$ can be performed for each subcarrier (or on a unit of a plurality of subcarriers).

By the way, in the OFDM scheme, when the phases of a plurality of subcarriers coincide with each other, there is a tendency that a large amplitude peak (instantaneous peak) appears.

On the other hand, in the case of a general power amplifier, when a signal with a large amplitude is inputted and output power comes closes to a saturated state, nonlinear distortion occurs. This also applies to a power amplifier used for amplifying a carrier on the transmission side of a transmission system. As in the case of the above-described OFDM scheme, if a large amplitude peak is included in the time waveform of an input signal, nonlinear distortion of a power amplifier occurs. Due to this distortion, the EVM (Error Vector Magnitude: modulation accuracy) of all streams is deteriorated, and the bit error rate is increased. Furthermore, due to this nonlinear distortion, there is also posed a problem that power leakage out of a band occurs.

Although the problem attributable to the nonlinear distortion can be solved by increasing the back-off of the power amplifier, there is a tradeoff relationship that the efficiency of the power amplifier decreases. Thus, as a technique for reducing the instantaneous peak, a technique has been proposed in which filtering is performed on a peak exceeding a predetermined level of threshold value, thereby reducing the peak while suppressing out-of-band leakage (see, e.g., Patent Document 1, etc.).

PRIOR ART DOCUMENT

Patent Document 1: Published Japanese Translation of PCT International Application No. 2009-543434

SUMMARY OF THE INVENTION

In the above-described conventional technique, it is necessary to insert a signal for peak reduction into the entire radio signal band. Therefore, EVM deterioration is inevitable. In addition, as described above, when eigenmode MIMO transmission is performed, a high multi-value number is allocated to a stream which can obtain a large eigenvalue. Thus, a bit error rate increases even with a slight EVM deterioration. On the other hand, a low multi-value number is allocated to a stream of small eigenvalue. Therefore, even if EVM deterioration occurs, a bit error rate does not increase greatly.

It is therefore an object of the present invention to control the EVM deterioration for each stream in accordance with the modulation multi-value number, suppress the EVM deterioration of a stream with a large eigenvalue, and conversely allow the EVM deterioration of a stream with a small eigenvalue, so that the peak power reduction can be achieved without deteriorating the bit error rate of the entire eigenmode MIMO transmission.

In accordance with an aspect, there is provided a peak power reduction device including: a unit for dividing digital information to be transmitted into a plurality of streams; a unit for selecting a modulation multi-value number of the plurality of streams and distribution of transmission power according to a transmission state; a unit for singular-value-decomposing transmission path characteristics of the streams and precoding the transmission path characteristics of the streams by a right singular value matrix; a unit for complex-mapping subcarriers of the streams according to the modulation multi-value number; a unit for converting a complex mapping signal into a time domain signal; a first unit for storing a conversion result as the time domain signal; a second unit for, when a peak value exceeding a predetermined threshold exists with respect to an amplitude of the time domain signal, calculating a peak time signal exceeding a predetermined threshold value from the peak value; a third unit for converting the peak time signal into a frequency domain signal and calculating a converted frequency domain peak signal; a fourth unit for calculating a peak stream signal by multiplying the frequency domain peak signal by a complex conjugate transpose matrix of a right singular value matrix; and a fifth unit for limiting an SN ratio of a peak stream signal level corresponding to the modulation multi-value number of the streams with respect to the peak stream signal obtained by the fourth unit to a predetermined deterioration amount or less.

The peak power reduction device may further include: a sixth unit for calculating a peak time signal whose level is restricted by converting the level-restricted peak stream signal to a time domain; and a seventh unit for reducing a peak component by subtracting the time domain peak signal obtained by the sixth unit from the time domain signal obtained by the first unit.

In the peak power reduction device, a modulation error ratio for each stream may be controlled according to the modulation multi-value number allocated to the streams by repeatedly operating the second unit to the seventh unit to calculate a peak-reduced time domain signal multiple times.

Effect of the Invention

According to the present invention, it is possible to reduce the peak power without deteriorating the bit error rate of the entire eigenmode MIMO transmission.

BRIEF DESCRIPTION OF THE DRAWINGS

FIG. 8 is a diagram for explaining Expression 28 and an example of an allowable EVM deterioration amount.

DETAILED DESCRIPTION OF THE EMBODIMENTS

Figure 1:
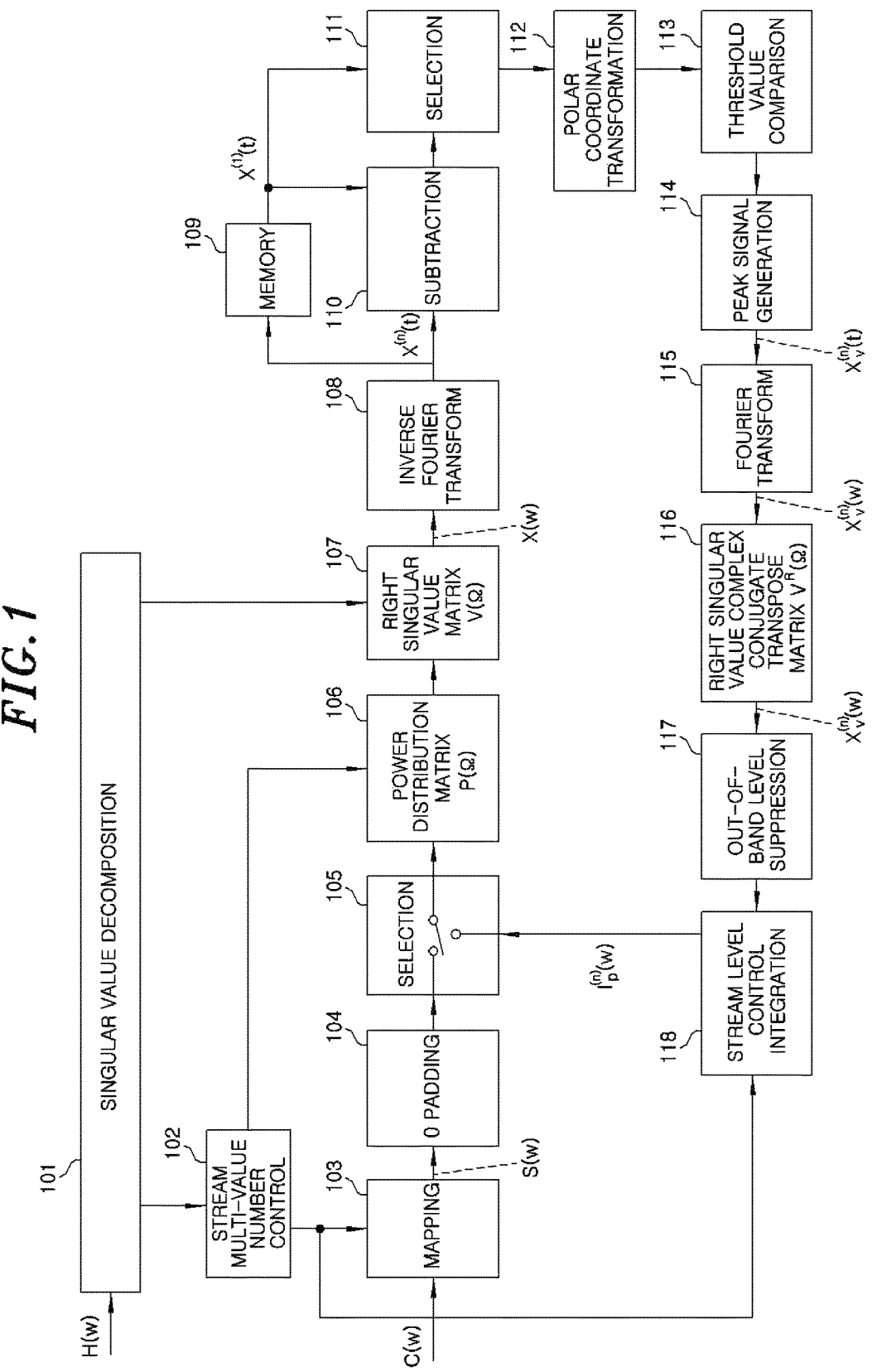
FIG. 1 shows a first example of a peak power reduction device according to an embodiment of the present invention.

Hereinafter, a peak power reduction device according to the present invention will be described in detail with reference to the embodiments shown in the drawings.

FIG. 1 shows a first example of a peak power reduction device according to an embodiment of the present invention. The peak power reduction device is provided on the input side of a power amplifier in order to reduce the peak appearing in an input signal of the carrier amplifying power amplifier existing on the transmission side of, for example, an OFDM wireless transmission system.

Figure 3:
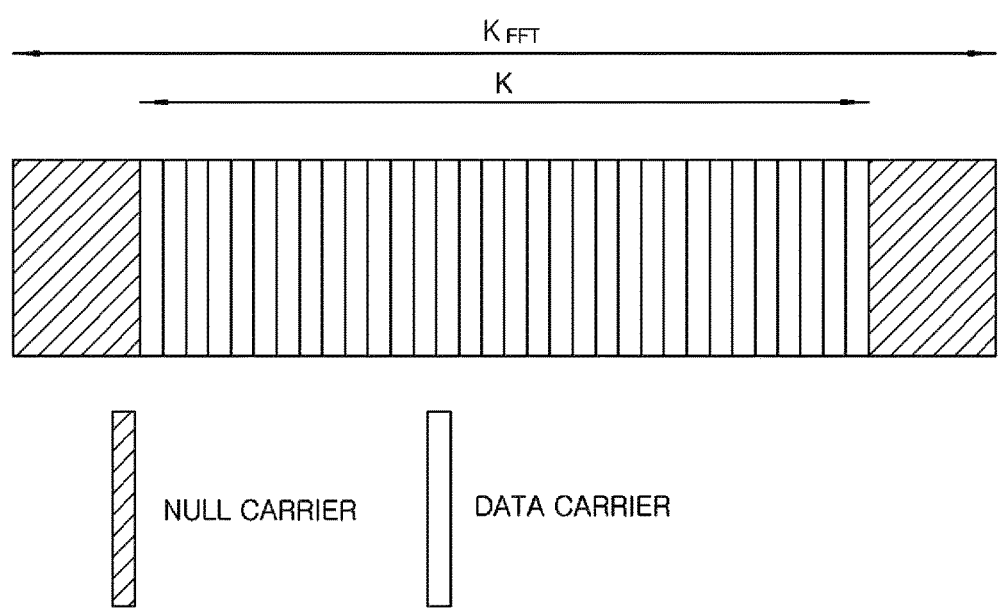
FIG. 3 is a diagram for explaining a subcarrier configuration.

In addition, as shown in FIG. 3, the number of points of FFT (Fast Fourier Transform) used for OFDM transmission is assumed to be $K_{FFT}$, and the number of subcarriers used is assumed to be K. At this time, it is assumed that the subcarriers in a transmission band are composed of a DATA carrier (information carrier) for transmitting information and a NULL carrier (out-of-band carrier). The DATA carrier is mapped by a modulation scheme such as QAM (Quadrature Amplitude Modulation) or the like and is used for information transmission.

The present invention will be described with reference to an OFDM signal for a radio transmission system that performs eigenmode MIMO transmission using the above-described OFDM transmission scheme. However, it may be possible to use a multicarrier transmission scheme similar to OFDM.

In the eigenmode MIMO transmission scheme, the precoding matrix shown in Expression 3 is required on the transmission side. Before explaining the peak reduction which is the main object of the present invention, reference is made to a method of obtaining the precoding matrix. The method of obtaining the precoding matrix includes two major methods.

The first method is a method of performing a singular value decomposition calculation on the transmission path characteristic matrix $H(\omega)$ obtained on the reception side and sending the precoding matrix and the eigenvalue matrix back to the transmission side. This is a method of sending the precoding matrix close to its characteristics back to the transmission side as a code book with respect to the precoding matrix obtained on the reception side.

The second method is a method of acquiring the precoding matrix by singular-value-decomposing the transmission path characteristic matrix $H(\omega)$ with the singular value decomposition 101 on the transmission side as shown in Expression 2. In the second method, it is indispensable that the transmission path characteristic matrix $H(\omega)$ is obtained on the transmission side. A plurality of realization methods is proposed as the method of obtaining the transmission path characteristic matrix $H(\omega)$ on the transmission side. For example, there are available a method of directly transmitting the transmission path characteristic matrix $H(\omega)$ obtained on the reception side to the transmission side and a method of obtaining the transmission path characteristic matrix $H(\omega)$ using the duality of the transmission path when the time division multiplexing scheme is used. In the present invention, the method of obtaining the transmission path characteristic matrix $H(\omega)$ will not be particularly mentioned. The following description will be made on the premise that the transmission path characteristic matrix $H(\omega)$ has been obtained.

The transmission path characteristic matrix $H(\omega)$ is a matrix of NT rows and NR columns, where NT and NR indicate the number of transmitting antennas and the number of receiving antennas. In this regard, the element of (i, j) of $H(\omega)$ is the transmission path characteristic between the $i^{th}$ transmitting antenna and the $j^{th}$ receiving antenna.

The transmission path characteristic matrix $H(\omega)$ is inputted to the singular value decomposition 101. In singular value decomposition 101, the transmission path characteristic matrix $H(\omega)$ is decomposed into a left singular value matrix ($U(\omega)$), a right singular value matrix ($V(\omega)$) and an eigenvalue matrix ($\Sigma(\omega)$) of $H(\omega)$ as shown in Expression 1. In this regard, the eigenvalue matrix $\Sigma(\omega)$ is represented by Expression 10.

$$\Sigma(\omega)=\text{diag}\{\sqrt{\lambda_1(\omega)}\sqrt{\lambda_2(\omega)}\ldots\sqrt{\lambda_L(\omega)}\} \qquad \text{(Expression 10)}$$

The eigenvalue matrix ($\Sigma(\omega)$) of the transmission path characteristic matrix $H(\omega)$ is inputted to the stream multi-value number control (102). On the other hand, the digital information $C(\omega)$ to be transmitted is inputted to the mapping (103). The digital information $C(\omega)$ is transmitted by placing the digital information $C(\omega)$ on the amplitude or phase of a constellation such as QAM (Quadrature Amplitude Modulation) or PSK (Phase Shift Keying). This process is called mapping. As the multi-value number for mapping increases, the information that can be transmitted becomes larger. However, the distance between signal points becomes narrower. Therefore, errors due to a noise are likely to occur. In performing this mapping process, the multi-value number is selected based on the multi-value number selection information from the stream multi-value number control (102). As described above, in the eigenmode MIMO transmission, as the eigenvalue ($\lambda_i$) of the transmission path becomes larger, the power of the transmission signal is also allocated larger. The transmission capacity can be increased by allocating a large scale multi-value number. Accordingly, the stream multi-value number control (102) allocates a multi-value number of each stream depending on the size of each element $\sqrt{\lambda_1(\omega)} \sqrt{\lambda_2(\omega)} \ldots \sqrt{\lambda_L(\omega)}$ of the eigenvalue matrix ($\Sigma(\omega)$) from the singular value decomposition (101). The stream multi-value number control (102) performs the power distribution for each stream at the same time and outputs the power distribution matrix $P(\omega)$ to the power distribution matrix (106).

As an example of the multi-value number allocation, 64 QAM (6 bit transmission) is allocated to the first stream having the largest eigenvalue, 16 QAM (4 bit transmission) is allocated to the second stream having the second largest eigenvalue, and QPSK (2 bit transmission) is allocated to the third stream having the smallest eigenvalue.

The mapped stream vector $S(\omega)=[s_1(\omega)\ s_2(\omega)\ \ldots\ s_L(\omega)]^T$, to which a proper multi-value number is allocated, is inputted to the 0 padding 104.

The 0 padding 104 is a process provided for performing oversampling in the inverse Fourier transform 108. The oversampling is performed for the number of FFT points, which is calculated by the inverse Fourier transform 108, at a rate of an integer multiple of (KFFT) (generally, a power of 2). For example, in the inverse Fourier transform with KFFT=1024 points, the number of oversampling FFT points is calculated with 4 KFFT=4096 points which is four times. Although the necessity of 0 padding process will be described later, it is desirable that the oversample is four or more times of the number of FFT points. At this time, in the 0 padding 104, 0 is additionally added just as much as (4−1) KFFT=3 KFFT.

The output signal of the 0 padding 104 is inputted to the selection 105. In the process of the present invention, in order to reduce the peak of the OFDM signal, it is necessary to repeat, plural times, a series of processes from the power distribution matrix 106 to the stream level control integration 118 shown in FIG. 1. First, the first repetition process will be described and, then, the second and subsequent processes will be described.

In the selection 105, the signal from the 0 padding 104 and the signal from the stream level control integration 118 are selected and outputted to the power distribution matrix 106. In the selection 105, the signal from the 0 padding 104 is selected and outputted in the first repetition process. In the second and subsequent processes, the signal from the stream level control integration 118 is selected and outputted.

In the power distribution matrix 106, the stream vector $S(\omega)$ is multiplied by the power distribution matrix $P(\omega)$. The power distribution matrix $P(\omega)$ to be multiplied at this time is based on the result calculated by the stream multi-value number control 102.

Thereafter, in the right singular value matrix 107, the right singular matrix $V(\omega)$ from the singular value decomposition 101 is multiplied to obtain a transmission signal vector $X(\omega)$.

These processes are similar to Expression 3 and are re-listed in Expression 11 as a function of the frequency $\omega$.

$$X(\omega)=V(\omega)P(\omega)S(\omega) \quad \text{(Expression 11)}$$

The transmission signal vector $X(\omega)$ is inputted to the inverse Fourier transform 108 and is transformed from the signal in the frequency domain ($\omega$) into the signal in the time domain (t). At this time, as described in the 0 padding 104, while conducting oversampling, the inverse Fourier transformation is performed with a point number of an integer multiple of KFFT. In order to implement the reduction processing of the peak component of the OFDM signal with high accuracy, it is desirable to perform the reduction processing in the region of an analog signal. However, since the signal processing in the analog domain is difficult, the processing is performed with the digital signal after oversampling in order to make the analog signal as close as possible.

This inverse Fourier transform processing is shown in Expression 12.

$$x^{(1)}(t)=\text{IFFT}[X(\omega)] \quad \text{(Expression 12)}$$

In this expression, IFFT [ ] represents the inverse Fourier transform processing. The number of elements of a time signal vector $x^{(1)}(t)$ obtained by the inverse Fourier transform is equal to the number of transmitting antennas. The (1) which is the superscript of $x^{(1)}(t)$ indicates the first repetition process. The $n^{th}$ repetition process is indicated as (n). In the following explanation, the superscript in other variables indicates the number of repetition processes.

The time signal vector $x^{(1)}(t)$ obtained by the inverse Fourier transform 108 is connected to the memory 109 and the subtraction 110. The memory 109 stores the input signal $x^{(1)}(t)$ only during the first repetition process. The output of the memory 109 is connected to the subtraction 110 and the selection 111. The processing of the subtraction 110 is necessary at the time of the second and subsequent repetition processes and will be described later.

In the selection 111, the signal from the memory 110 is selected and outputted when the repetition process is the first time. In the subsequent repetition processes, the signal from the subtraction 110 is selected and outputted to the Polar coordinate transformation 112.

In the polar coordinate transformation 112, the amplitude and phase of the time signal vector $x^{(1)}(t)$ are calculated (Expression 13).

$$r^{(1)}(t)=|x^{(1)}(t)|$$

$$\theta^{(1)}(t)=\text{angle}(x^{(1)}(t)) \quad \text{(Expression 13)}$$

It is necessary to perform the polar coordinate transformation processing for all signals of the respective elements and the respective time t.

The output of polar coordinate transformation 112 is inputted to the threshold value comparison 113 and the peak signal generation 114.

In the threshold value comparison 113, the amplitude $r^{(1)}(t)$ is compared with a predetermined threshold value THR. If there is an amplitude exceeding the threshold value THR, it is determined that a large signal peak is present in the time signal of that time and element.

In the peak signal generation 114, a signal $x_p^{(1)}(t)$ indicating the peak component is calculated. The amplitude signal $r^{(1)}(t)$ and the phase signal $\theta^{(1)}(t)$ from the polar coordinate transformation 112 are inputted to the peak signal generation 114. A peak signal vector $x_p^{(0)}(t)$ represented by Expression 14 is calculated on the basis of the peak detection signal from the threshold value comparison 113.

$$\begin{cases} x_p^{(1)}(t) = \{r^{(1)}(t) - THR\} \cdot e^{j\theta^{(1)}(t)} & \text{if } r^{(1)}(t) > THR \\ x_p^{(1)}(t) = 0 & \text{otherwise} \end{cases} \quad \text{(Expression 14)}$$

The $\{R^{(1)}(t)-THR\}$ in the brackets in the upper equation of Expression 14 denotes the amplitude component of the peak exceeding a threshold value, and the $e^{j\theta^{(1)}(t)}$ denotes the phase component thereof.

Figure 4:
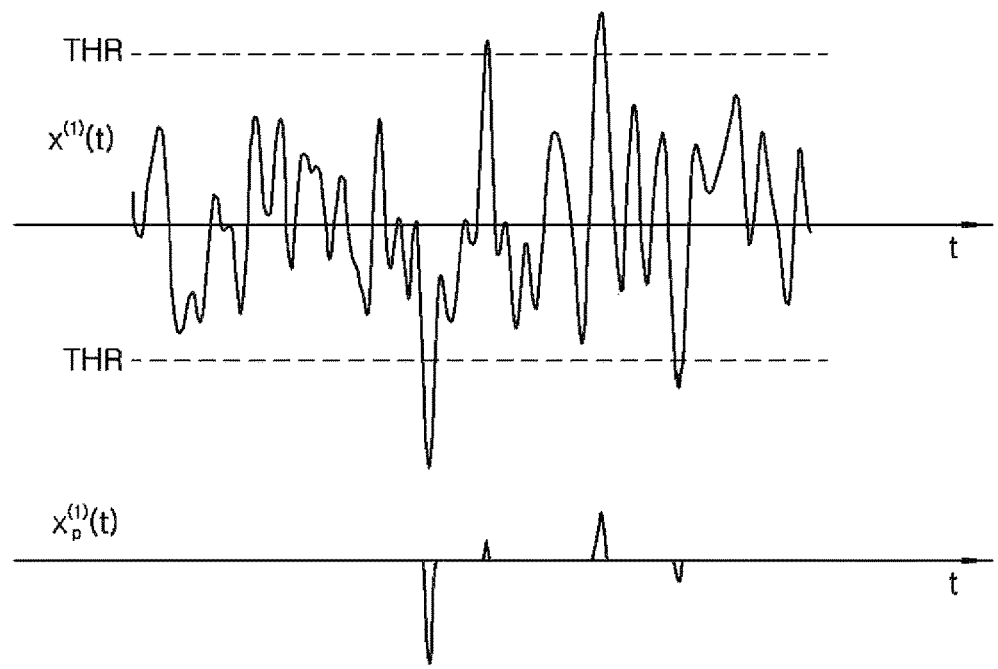
FIG. 4 is a conceptual diagram of a peak signal.

FIG. 4 is a conceptual diagram of Expression 14. The diagram shows a real number or an imaginary number component of the time signal vector $x^{(1)}(t)$ and provides a threshold value THR is provided for the signal. However, the actual process shown in Expression 14 is performed on a complex number.

The peak signal $x_p^{(1)}(t)$ is inputted to the Fourier transform 115. In the Fourier transform 115, as in the case of the inverse Fourier transform 108, a Fourier transform is performed with a point number which is an integer multiple of KFFT. The peak frequency vector $x_p^{(1)}(\omega)$ obtained by transforming the peak signal $x_p^{(1)}(t)$ into the frequency domain is calculated.

Figure 5:
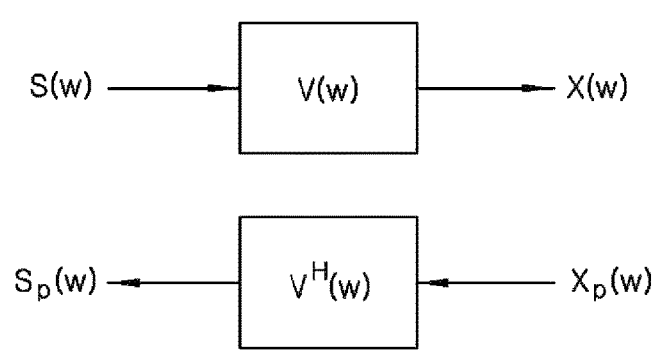
FIG. 5 is a diagram for explaining conversion between a stream region signal and a transmission frequency domain signal.

In the right singular value complex conjugate transpose matrix 116, the peak frequency vector $x_p^{(1)}(\omega)$ is multiplied by the right singular value complex conjugate transpose matrix $V^H(\omega)$. As shown in FIG. 5, the stream vector $S(\omega)$ is transformed into the transmission signal vector $X(\omega)$ by multiplying the stream vector $S(\omega)$ by the right singular value matrix $V(\omega)$. Conversely, in the right singular value complex conjugate transpose matrix 116, by multiplying the right singular value complex conjugate transpose matrix $V^H(\omega)$, the peak frequency vector $X_p^{(1)}(\omega)$ is decomposed into a stream region. A signal obtained by transforming the peak frequency vector $X_p^{(1)}(\omega)$ into a stream region is represented by Expression 15. $S_p^{(1)}(\omega)$ is referred to as a peak stream vector.

$$S_p^{(1)}(\omega)=V^H(\omega)X_p^{(1)}(\omega) \quad \text{(Expression 15)}$$

As described above, the peak stream vector $S_p^{(1)}(\omega)$ is a signal obtained by transforming the peak signal $x_p^{(1)}(t)$ of the transmission signal vector $x^{(1)}(t)$ into a frequency domain signal for each stream.

Figure 6:
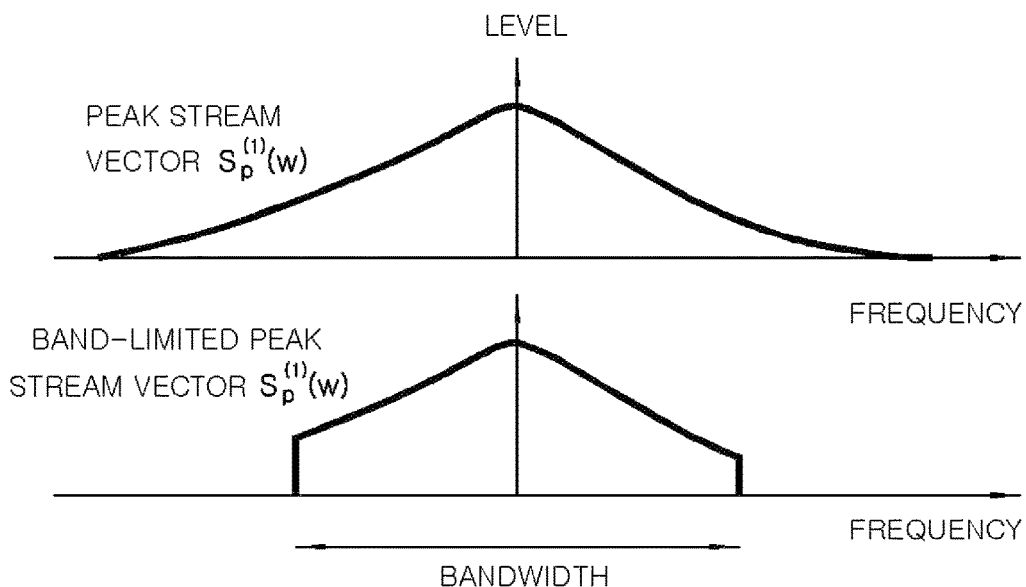
FIG. 6 is a diagram for explaining a peak stream vector and a band-limited peak stream vector.

The peak stream vector $S_p^{(1)}(\omega)$ from the right singular value complex conjugate transpose matrix 116 is inputted to the out-of-band level suppression 117. The peak stream vector $S_p^{(1)}(\omega)$ is a function of the frequency $\omega$. Since the peak stream vector $S_p^{(1)}(\omega)$ is a wide band, it has a component even outside the band. Therefore, in the NULL carrier region outside the band shown in FIG. 6, if the value of the peak stream vector $S_p^{(1)}(\omega)$ is replaced by 0, leakage does not occur outside the band.

The output of the out-of-band level suppression 117 is inputted to the stream level control integration 118. The amplitude level of the band-limited peak stream vector $S_p^{(1)}(\omega)$ is controlled in accordance with the modulation multi-value number from the stream multi-value number control 102. The peak of the OFDM signal can be reduced by subtracting the peak signal decomposed for each stream from the signal not subjected to peak reduction. At that time, in order to prevent the overall bit error rate from being greatly deteriorated, processing is performed while appropriately adjusting the level thereof for each stream.

Figure 2:
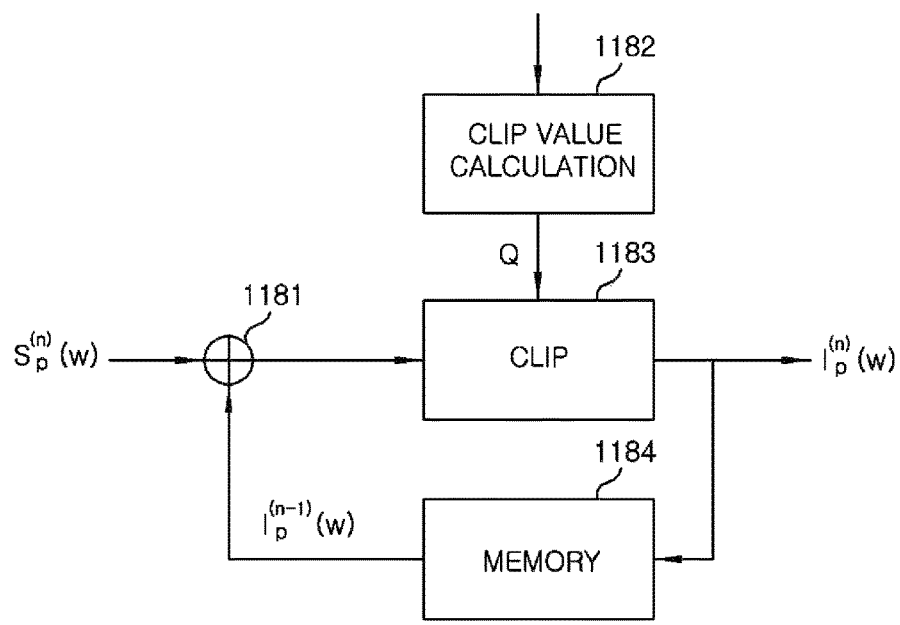
FIG. 2 is a diagram for explaining a configuration of stream level control integration of a peak power reduction device according to an embodiment of the present invention.

The detailed configuration of the stream level control integration 118 is shown in FIG. 2.

The peak stream vector $S_p^{(1)}(\omega)$ from the out-of-band level suppression 117 is inputted to an adder 1181. In the adder 1181, the peak stream vector $S_p^{(1)}(\omega)$ is added to the output signal from the memory 1184. In the first repetition process, the output result of the memory 1184 is 0, and the value of the peak stream vector $S_p^{(1)}(\omega)$ is directly inputted to the clip 1183. The clip vector $Q(\omega)=[q_1(\omega)\ q_2(\omega)\ \ldots\ q_L(\omega)]^T$ from the clip value calculation 1182 is inputted to the other input of the clip 1183. In the clip 1183, the magnitude of each element of the clip vector $Q(\omega)$ is compared with the signal from the adder 1181. The magnitude of the addition result is limited so as not to exceed $Q(\omega)$. The method of calculating the magnitude of the clip value $Q(\omega)$ will be described later. The integration result $I_p^{(1)}(\omega)$, which is the output of the stream level control integration 118, is finally equivalent to the value subtracted from the signal not subjected to peak reduction. The subtraction of the integration result corresponds to the application of a noise to a signal not subjected to the original peak reduction. Therefore, it is necessary to limit the amount of noise with the magnitude of the clip value $Q(\omega)$ in accordance with the multi-value number. For example, for a stream to which a large multi-value number such as 256 QAM or the like is allocated, the allowable EVM is also small. Thus, the value of the clip value $q_k(\omega)$ is also small. Conversely, in the case of a stream to which a small multi-value number such as QPSK or the like is allocated, the value of the clip value $q_k(\omega)$ may be large.

The output of the clip 1183 is outputted as the integration result $I_p^{(1)}(\omega)$ and is inputted to the memory 1184. In the memory 1184, the integration result $I_p^{(1)}(\omega)$ is stored in a storage element.

Brief description will be made on the second and subsequent repetition processes of the stream level control integration 118. The peak stream vector $S_p^{(n)}(\omega)$ from the out-of-band level suppression 117 obtained in the $n^{th}$ repetition process is inputted. In the adder 1181, the peak stream vector $S_p^{(n)}(\omega)$ is added to the integration result $I_p^{(n-1)}(\omega)$ of the previous cycle stored in the memory 1184. The clip 1183 and the memory 1184 perform the same process as the first repetition process and perform integration calculation of the peak stream vector $S_p^{(n)}(\omega)$. The above process of the stream level control integration 118 is shown in Expression 16.

$$I_p^{(n)}(\omega)=\text{clip}[I_p^{(n-1)}(\omega)+S_p^{(n)}(\omega),Q(\omega)]$$

$$I_p^{(0)}(\omega)=0 \quad \text{(Expression 16)}$$

In Expression 16, when the magnitude of each element of a vector A is greater than the magnitude of the corresponding element of vector $Q(\omega)$, $B=\text{clip}[A, Q]$ represents the process of clipping with the element of the corresponding vector $Q(\omega)$. With respect to the processing of clip $[A, Q]$, two specific examples will be described below.

As a first example, when a norm $|a_k|$ of $a_k$ is larger than $q_k$, $a_k$ is multiplied by a coefficient of $q_k(\omega)/|a_k|$ as shown in Expression 17. The level of the norm of $a_k$ is suppressed so that the norm of $a_k$ does not exceed $q_k$.

$$b_k = \begin{cases} a_k \times \dfrac{q_k(\omega)}{|a_k|} & \text{if } |a_k| > q_k(\omega) \\ a_k & \text{otherwise} \end{cases} \quad \text{(Expression 17)}$$

In this regard, $A=[a_1\ a_2\ \ldots\ A_L]^T$, and $B=[b_1\ b_2\ \ldots\ B_L]^T$. The elements of A and B are complex numbers, and the elements of Q are real numbers. However, in the processing of the first example, calculation and division of norms are necessary. There is a disadvantage that the calculation scale is large.

Therefore, the second example simplifying the calculation processing is shown in Expression 18.

$$\Re[b_k] = \begin{cases} q_k & \text{if } \Re[a_k] > q_k \\ -q_k & \text{if } \Re[a_k] < -q_k \\ \Re[a_k] & \text{otherwise} \end{cases} \quad \text{(Expression 18)}$$

-continued $$\Im[b_k] = \begin{cases} q_k & \text{if } \Im[a_k] > q_k \\ -q_k & \text{if } \Im[a_k] < -q_k \\ \Im[a_k] & \text{otherwise} \end{cases}$$

In Expression 18, $\Re[\ ]$ and $\Im[\ ]$ are functions indicating a real number part and an imaginary number part.

In the calculation according to Expression 18, strictly speaking, the norm of $a_k$ may exceed $q_k$. However, the norm of $a_k$ is close to $q_k$, and the error is not a big problem. By the processing explained in Expression 17 or Expression 18, the output result of the clip 1183 is suppressed in level according to the modulation multi-value number.

The integration signal $I_p^{(1)}(\omega)$ from the stream level control integration 118 is inputted to the selection 105.

The above process is the first repetition process. The process of decomposing the peak component of the OFDM signal for each frequency domain and each stream and controlling the level according to the multi-value number of the stream has been described above.

In the second and subsequent repetition processes, the selection 105 operates to output a signal from the stream level control integration 118. Accordingly, in the second and subsequent repetition processes, the output of the selection 105 is $I_p^{(1)}(\omega)$, and the second and subsequent repetition processes are performed with respect to the peak stream signal.

The processing of the power distribution matrix 106 and the right singular value matrix 107 is similar to the first repetition process, and the output of the right singular value matrix 107 is represented by Expression 19.

$$X_p^{(2)}(\omega) = V(\omega)P(\omega)I_p^{(1)}(\omega) \quad \text{(Expression 19)}$$

The peak frequency vector $X_p^{(2)}(\omega)$ is inputted to the inverse Fourier transform 108 and is transformed from the signal in the frequency domain into the signal in the time domain while performing oversampling as in the first repetition process. This inverse Fourier transform processing is shown in Expression 20.

$$x_p^{(2)}(t) = \text{IFFT}[X_p^{(2)}(\omega)] \quad \text{(Expression 20)}$$

The peak time signal vector $X_p^{(2)}(t)$ obtained by the inverse Fourier transform 108 is inputted to the subtraction 110. In the subtraction 110, as shown in Expression 21, the peak component is reduced by subtracting the peak time signal vector $x_p^{(2)}(t)$ from the original time signal $x^{(1)}(t)$ obtained in the first repetition process stored in the memory 109 and not subjected to peak reduction.

$$x^{(2)}(t) = x^{(1)}(t) - x_p^{(2)}(t) \quad \text{(Expression 21)}$$

Although the peak time signal vector $x_p^{(2)}(t)$ indicates the peak component of the time signal vector $x^{(1)}(t)$, since the nonlinear calculation processing is performed in which the peak time signal vector $x_p^{(2)}(t)$ is replaced by 0 in the out-of-band level suppression 117, it is not necessarily required that the peak signal can be reproduced accurately.

Therefore, even if the peak component is subtracted by Expression 21, the peak may remain although the peak component of $x^{(2)}(t)$ which is the subtraction result is reduced. Furthermore, by performing the nonlinear calculation processing, a peak component which has not been generated in the first repetition process may be newly generated. Therefore, it is impossible to completely reduce the peak by the process shown in Expression 21.

The transmission time signal vector $x^{(2)}(t)$ from the subtraction 110 is inputted to the selection 111. In the selection 111, the signal from the subtraction 111 is selected and outputted in the second and subsequent repetition processes.

In the polar coordinate transformation 112, the amplitude signal $r^{(2)}(t)$ and the phase signal $\theta^{(2)}(t)$ of $x^{(2)}(t)$ are calculated. The amplitude signal $r^{(2)}(t)$ is compared with a threshold value THR in the threshold value comparison 113. The peak time signal vector $x_p^{(2)}(t)$ is outputted in the peak signal generation 114. The peak time signal vector $x_p^{(2)}(t)$ shows a peak component that cannot be reduced by Expression 21. The peak time signal vector $x_p^{(2)}(t)$ is transformed into a signal in the frequency domain by the Fourier transform 115, and $x_p^{(2)}(\omega)$ is calculated.

The peak frequency vector $X_p^{(2)}(\omega)$ is again multiplied by the right singular value complex conjugate transpose matrix $V^H(\omega)$ in the right singular value complex conjugate transpose matrix 116 to output a peak stream vector $S_p^{(2)}(\omega)$.

In the out-of-band level suppression 117, the out-of-band component is replaced by 0 again. In the stream level control integration 118, integration and cropping shown in Expression 22 are performed on the first integration result $I_p^{(1)}(\omega)$, and the result is outputted to the selection 105.

$$I_p^{(2)}(\omega) = \text{clip}[I_p^{(1)}(\omega) + S_p^{(2)}(\omega), Q] \quad \text{(Expression 22)}$$

The above processing is the second repetitive calculation process.

The third and subsequent repetitive calculation processes also perform the same calculation as the second repetitive calculation process. The peak component of the time signal $x^{(n)}(t)$ is gradually reduced as the number of repetitive calculation increases. The peak time signal vector $x_p^{(n)}(t)$ and the peak frequency vector $X_p^{(n)}(\omega)$ come close to zero. On the other hand, as the number of repetitive calculation increases, the peak component is integrated in the stream level control integration 118. The integration result $I_p^{(n)}(\omega)$ converges to a value for reproducing the peak component.

By the series of processes, the peak component of the time signal $x^{(n)}(t)$ is reduced, the signal amplitude reaching the nonlinear region of the power amplifier is reduced, and the nonlinear distortion component of the power amplifier is reduced.

Figure 7:
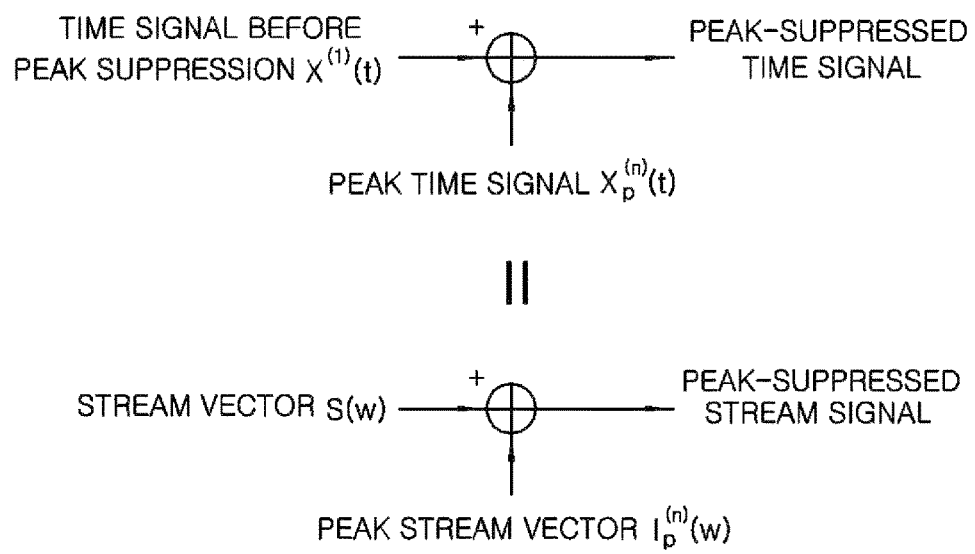
FIG. 7 is a diagram for explaining the equivalence between calculation of a stream region and calculation of a time domain.

Finally, a method of calculating the clip vector $Q(\omega)$ in the stream level control integration 118 omitted in the above description will be described. The peak stream vector $S_p^{(n)}(\omega)$ is a signal obtained by decomposing the peak component into a stream. The peak stream integration vector $I_p^{(n)}(\omega)$ obtained by integrating the peak stream vector $S_p^{(n)}(\omega)$ with the number of repetition times is finally transformed into the peak signal $x_p^{(n)}(t)$ in the time domain. Then, by subtracting this signal from the time signal $x^{(1)}(t)$ before reducing the peak, the peak component is reduced. As described above, the subtraction is performed in the time domain. Since this calculation is a linear process, as shown in FIG. 7, the calculation is equivalent to the subtraction of the peak stream integration vector $I_p^{(N)}(\omega)$ from the stream vector $S(\omega)$ in the frequency domain decomposed into the stream.

As described above, the subtraction of the peak stream integration vector $I_p^{(n)}(\omega)$ acts like a noise for the stream vector $S(\omega)$. A multi-value number is determined according to the magnitude of the eigenvalue $\Sigma$ for the stream vector $S(\omega)$. The required SNR differs for each stream. For example, the required SNR of a stream using 256 QAM is about 17 dB, and the required SNR of a stream using QPSK is about 3 dB. Therefore, if the peak stream integration vector $I_p^{(n)}(\omega)$ of a large level is subtracted from the stream vector $S(\omega)$ to which 256 QAM is allocated, the EVM is greatly deteriorated, which leads to an increase in the bit error rate. On the other hand, if the stream has a low multi-value number such as QPSK or the like, even when subtracting the peak stream integration vector Ip(n) (ω) of a certain high level, no significant deterioration in the bit error rate occurs. In this manner, the magnitude of the peak stream integration vector $I_p^{(n)}(\omega)$ that can be applied varies depending on the multi-value number allocated to the stream vector S(ω). The level thereof is suppressed by the clip vector Q(ω). As described above, in the stream level control integration 118, it is necessary to appropriately set the clip vector Q(ω) according to the modulation multi-value number. In the following, a method of calculating this clip vector Q(ω) will be described.

First, the reception SNR of the $k^{th}$ stream will be mentioned below. Assuming that the power of the signal component in the reception signal is $P_{signal}(k, \omega)$, Expression 23 is established.

$$P_{signal}(k, \omega) = \lambda_k(\omega)P_k(\omega)E[|s_k|^2] \quad \text{(Expression 23)}$$
$$= \lambda_k(\omega)P_k(\omega)P_s$$

$$P_{peak\ noise}(k, \omega) = \sigma^2 + \lambda_k(\omega)P_k(\omega)|i_{p,k}^{(n)}(\omega)|^2 \quad \text{(Expression 24)}$$

$\sigma^2$ in the first term of Expression 23 denotes the thermal noise power generated in the reception unit. The second term denotes the power of the $k^{th}$ stream in the peak stream integration vector $I_p^{(n)}(\omega)$. As described above, the peak stream integration vector $I_p^{(n)}(\omega)$ acts as a noise. Thus, the peak stream integration vector $I_p^{(n)}(\omega)$ is applied as a noise component on the transmission side and is a factor causing EVM deterioration.

From Expression 23 and Expression 24, the SNR of the $k^{th}$ stream is represented by Expression 25.

$$SNR(k, \omega) = \frac{P_{signal}(k, \omega)}{P_{peak\ noise}(k, \omega)} \quad \text{(Expression 25)}$$

$$SNR(k, \omega) = \frac{\lambda_k(\omega)P_k(\omega)P_s}{\sigma^2 + \lambda_k(\omega)P_k(\omega)|i_{p,k}^{(n)}(\omega)|^2}$$

In Expression 25, the required SNR not reducing the peak signal when $|i_{p,k}^{(n)}(\omega)|^2=0$ is defined as $\Gamma_0$ and is represented by Expression 26.

$$SNR_0(k, \omega) = \frac{\lambda_k(\omega)P_k(\omega)P_s}{\sigma_0^2} = \Gamma_0 \quad \text{(Expression 26)}$$

Further, the amount of deterioration of the required SNR due to peak reduction is assumed to be ε. The stream level control integration 118 operates so that the amount of deterioration of the required SNR falls below ε. For example, if the required SNR of 256 QAM is 17 dB and if the amount of deterioration of the required SNR due to peak reduction is 0.1 dB, 10 $\log_{10}(\Gamma_0)$=17 dB and 10 $\log_{10}(\varepsilon)$ =0.1. Therefore, the amount of deterioration of the required SNR is defined by Expression 27.

$$10\ \log_0\{SNR^0(k,\omega)\}-10\ \log_{10}\{SNR(k,\omega)\}<10\ \log_{10}[\varepsilon] \quad \text{(Expression 27)}$$

Expression 27 is expanded and rearranged into Expression 28.

$$10\log_{10}\left\{\frac{\lambda_k(\omega)P_k(\omega)P_s}{\sigma_0^2}\right\} - \quad \text{(Expression 28)}$$
$$10\log_{10}\left\{\frac{\lambda_k(\omega)P_k(\omega)P_s}{\sigma_0^2 + \lambda_k(\omega)P_k(\omega)|i_{p,k}^{(n)}(\omega)|^2}\right\} < \varepsilon$$
$$10\log_{10}\left\{\frac{\sigma_0^2 + \lambda_k(\omega)P_k(\omega)|i_{p,k}^{(n)}(\omega)|^2}{\sigma_0^2}\right\} < \varepsilon$$
$$10\log_{10}\left\{1 + \frac{\Gamma_0}{P_s}|i_{p,k}^{(n)}(\omega)|^2\right\} < \varepsilon$$
$$1 + \frac{\Gamma_0}{P_s}|i_{p,k}^{(n)}(\omega)|^2 < 10^{\varepsilon/10}$$
$$|i_{p,k}^{(n)}(\omega)|^2 < \frac{P_s}{\Gamma_0}(10^{\varepsilon/10} - 1)$$

In Expression 28, $i_{p,k}^{(n)}(\omega)$ denotes the kth element of the peak stream integration vector $I_p^{(n)}(\omega)$.

According to Equation 28, the level of the applicable peak stream integration vector $I_p^{(n)}(\omega)$ is determined by the required SNR Γ0 and the allowable required SNR deterioration amount ε. Therefore, in the clip value calculation 1182, the clip value vector Q(ω) obtained according to Expression 28 is obtained. If the level is suppressed by the magnitude of the clip value vector Q(ω), the bit error rate is not greatly deteriorated.

$$Q(\omega) = \frac{P_s}{\Gamma_0(\omega)}(10^{\varepsilon/10} - 1) \quad \text{(Expression 29)}$$

FIG. 8 shows the summarized results of $(10^{\varepsilon/10}-1)/\Gamma_0(\omega)$ of Expression 29 required for calculating the required SNR: $\Gamma_0$ and the clip value vector Q(ω) for each modulation scheme of each stream on the premise of error correction at a coding rate 1/2, and examples of the allowable EVM deterioration amount.

In addition, the maximum number $L_{max}$ of streams that can be transmitted is limited by the smaller value of the number of transmitting antennas $N_T$ and the number of receiving antennas $N_R$. Depending on the state of the transmission path characteristics H(ω), the number of transmitted streams L may be smaller than the $L_{max}$. For example, when the number of antennas is four, the number of transmitted streams L becomes 3 or less in most of the transmission path characteristics H(ω). This is because in the fourth stream having the smallest eigenvalue, the eigenvalue becomes too small, whereby in most cases, it is difficult to perform transmission using this stream. In such a case, the fourth stream is not transmitted. Therefore, q4(ω) may be a large value or may satisfy 4(ω)≈Pusher 300. It is therefore possible to expect a large peak reduction effect.

According to the first embodiment of the present invention described above, by concentrating the component that reduces the peak of OFDM on the stream having a small eigenvalue, it is possible to effectively reduce the peak power of OFDM without largely deteriorating the bit error rate of the entire eigenmode MIMO transmission.

This application claims the benefit of priority based on Japanese Patent Application No. 2015-140473 filed on Jul. 14, 2015, the disclosure of which is incorporated herein by reference in its entirety.

INDUSTRIAL APPLICABILITY

The present invention can also be applied to an application for reduction of the peak power by concentrating a peak reducing component on a stream having a small eigenvalue.

| Description of Reference Numerals |
|---|
| 101: singular value decomposition |
| 102: stream multi-value number control |
| 103: mapping     104: 0 padding |
| 105: selection   106: power distribution matrix |
| 107: right singular value matrix |
| 108: inverse Fourier transform |
| 109: memory     110: subtraction |
| 111: selection |
| 112: polar coordinate transformation |
| 113: threshold value comparison |
| 114: peak signal generation |
| 115: Fourier transform |
| 116: right singular value complex conjugate transpose matrix |
| 117: out-of-band level suppression |
| 118: stream level integration |
| 1181: adder    1182: clip value calculation |
| 1183: clip     1184: memory |

What is claimed is:

1. A peak power reduction device, comprising:
a unit for dividing digital information to be transmitted into a plurality of streams;
a unit for selecting a modulation multi-value number of the plurality of streams and distribution of transmission power according to a transmission state;
a unit for singular-value-decomposing transmission path characteristics of the streams and precoding the transmission path characteristics of the streams by a right singular value matrix;
a unit for complex-mapping subcarriers of the streams according to the modulation multi-value number;
a unit for converting a complex mapping signal into a time domain signal;
a first unit for storing a conversion result as the time domain signal;
a second unit for, when a peak value exceeding a predetermined threshold exists with respect to an amplitude of the time domain signal, calculating a peak time signal exceeding a predetermined threshold value from the peak value;
a third unit for converting the peak time signal into a frequency domain signal and calculating a converted frequency domain peak signal;
a fourth unit for calculating a peak stream signal by multiplying the frequency domain peak signal by a complex conjugate transpose matrix of a right singular value matrix; and
a fifth unit for limiting an SN ratio of a peak stream signal level corresponding to the modulation multi-value number of the streams with respect to the peak stream signal obtained by the fourth unit to a predetermined deterioration amount or less.

2. The device of claim 1, further comprising:
a sixth unit for calculating a peak time signal whose level is restricted by converting the level-restricted peak stream signal to a time domain; and
a seventh unit for reducing a peak component by subtracting the time domain peak signal obtained by the sixth unit from the time domain signal obtained by the first unit.

3. The device of claim 2, wherein a modulation error ratio for each stream is controlled according to the modulation multi-value number allocated to the streams by repeatedly operating the second unit to the seventh unit to calculate a peak-reduced time domain signal multiple times.

* * * * *